United States Patent [19]
Combastet

[11] 4,077,278
[45] Mar. 7, 1978

[54] TORQUE CONVERTER

[76] Inventor: Michel Combastet, 43, rue de Villiers, Neuilly-sur-Seine, France, F 92200

[21] Appl. No.: 715,194

[22] Filed: Aug. 17, 1976

[30] Foreign Application Priority Data

Oct. 10, 1975 France .................................. 75 31066

[51] Int. Cl.$^2$ .......................... F16H 37/06; F16H 1/38
[52] U.S. Cl. ........................................ 74/682; 74/710
[58] Field of Search .................. 74/710, 713, 714, 682

[56] References Cited

U.S. PATENT DOCUMENTS

| 2,221,186 | 11/1940 | Grosch ................................. 74/710 |
| 2,480,032 | 8/1949 | Kochis ................................. 74/682 |
| 3,645,152 | 2/1972 | Olcer .................................. 74/682 |
| 3,770,879 | 11/1973 | Watson ................................ 74/682 |

*Primary Examiner*—Leonard H. Gerin
*Attorney, Agent, or Firm*—Wenderoth, Lind & Ponack

[57] ABSTRACT

A torque converter includes two differentials, the cage of the first differential receiving the input shaft power and the cage of the second differential driving the power-receiving output shaft. Both differentials have their planet wheels coupled by pairs, the first group constituting a gear train providing a ratio M while the second group constitutes a gear train providing a ratio N, the ratio M/N differing from unity. The converter input shaft is rigid with the first planet carrier while the output shaft is rigid with the second planet carrier cage.

6 Claims, 4 Drawing Figures

TORQUE CONVERTER

BACKGROUND OF THE INVENTION

This invention relates in general to torque converters and has specific reference to a mechanical torque converter operating by differential retroaction.

For many years extensive studies have been conducted with a view to replace conventional speed-change mechanisms or gearboxes with torque converters the main advantage of which is the possibility of utilizing automatically the maximum output or efficiency of the driving motor or engine while maintaining the latter during a longer time period at the speed yielding the maximum torque. Hydraulic and mechanical torque converters are known in the art. Nowadays hydraulic torque converters have become preponderant, but they can dispense with the use of the speed-change mechanism only in association with over-powered motors or engines.

Therefore, a wide demand has developed in recent years for a torque converter of simple and sturdy construction, of relatively low cost and easy maintenance.

SUMMARY OF THE INVENTION

It is the primary object of the present invention to provide a torque converter meeting these requirements, which is of the mechanical type operating by differential retroaction and which includes two differentials, the cage of the first differential receiving the input shaft power and the cage of the second differential driving the power-receiving output shaft, both differentials having their planet wheels coupled by pairs, the first group constituting a gear train providing a ratio M while the second group constitutes another gear train providing a ratio N, the ratio M/N differing from unity, this converter being characterized in that the input shaft is coupled with the first planet-carrier or cage while the output shaft is coupled with the second planet-carrier or cage.

According to a feature characterizing this invention, both differentials are mounted in parallel.

According to another feature characterizing this invention, both differentials are mounted in series.

Furthermore, according to a complementary feature of this invention, the two differentials are incorporated in each other.

BRIEF DESCRIPTION OF THE DRAWINGS

Other features and advantages of this invention will appear as the following description proceeds with reference to the attached drawings illustrating diagrammatically by way of example typical embodiments of the invention, and wherein.

DETAILED DESCRIPTION OF THE INVENTION

Figure 1:
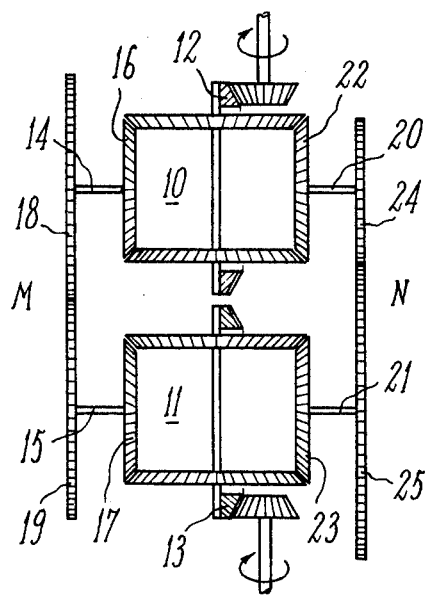
FIG. 1 is a diagrammatic view showing a first embodiment of the invention in which the differentials are mounted in parallel.

Referring first to FIG. 1, the reference numerals 10 and 11 designate the pair of differentials constituting the converter of this invention. The input cage 12 of the first differential 10 receives the power to be transmitted and the output cage 13 of the second differential 11 drives the receiving member.

The shafts 14 and 15 driven by the planet wheels 16 and 17 of the first and second differentials, respectively, are coupled through a pair of gears 18 and 19 (or gear trains) providing a ratio M. The shafts 20 and 21 of planet wheels 22 and 23 respectively of differentials 10 and 11 are coupled via a pair of gears 24 and 25 (or trains of gears) providing another ratio N. The ratio M/N is selected to be other than unity.

In operation, when the input cage 12 receives the power to be transmitted (velocity $V_E$, torque $C_E$), the two differentials thus coupled balance the torque $C_S$ and the velocity $V_S$ of output cage 13 in order to overcome the resistant torque of the receiving member. Thus a variation in the velocity $V_S$ conjugated with a variation of opposite direction of the torque $C_S$ is obtained without causing any variation in the input velocity $V_E$ and input torque $C_E$.

Figure 2:
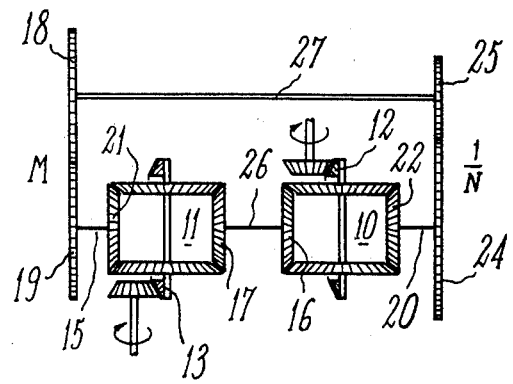
FIG. 2 is a diagrammatic view of a second embodiment wherein the differentials are mounted in series.

In the exemplary embodiment illustrated in FIG. 2, the two differentials 10 and 11 are mounted in series, with their registering planet wheels 16 and 17 mounted on a common shaft 26. Shafts 20 and 15 driven by planet gears 22 and 21, respectively, of the first and second differentials, are coupled by means of the trains of gears 24, 25, 18 and 19, wherein gears 18 and 25 are mounted on a common shaft 27. The train of gears 18 and 19 provides a ratio M and train 24 and 25 provides another ratio 1/N with M/N $\neq$ 1. The mode of operation of this second embodiment is the same as that of the first embodiment described hereinabove.

Figure 3:
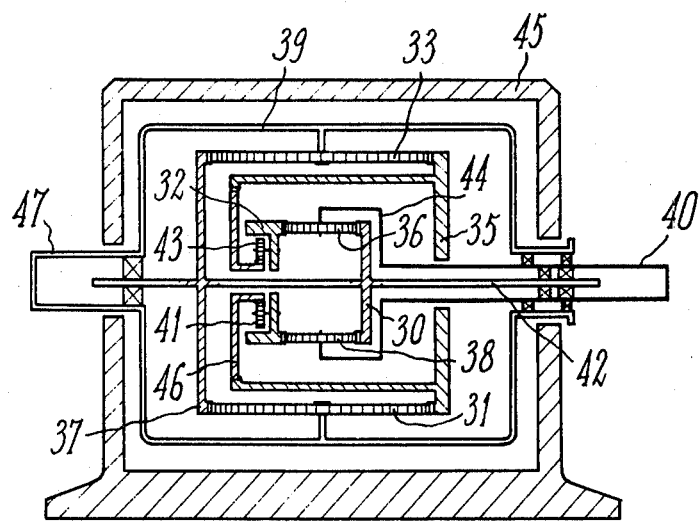
FIG. 3 is a vertical axial section of a torque converter according to this invention wherein the two differentials are incorporated in each other.

In order to reduce the over-all dimensions of the converter, the embodiment illustrated in FIG. 3 may be contemplated, in which the two differentials are incorporated in each other.

In this construction, the first differential comprises two satellite gears 36 and 38, a sun wheel 30 and an annulus 32. The driving shaft 40 is rigid with the cage 44 carrying the satellite gears 36 and 38. The sun wheel 30 is rigid with a central shaft 42.

The second differential comprises a pair of satellite gears 31 and 33 and a pair of sun wheels 35 and 37. The sunwheel 35 revolves about the shaft 40 while sun wheel 37 is rigid with the central shaft 42. Both satellite gears 31 and 33 are carried by a cage 39 supporting the output shaft 47 driving the receiving member.

The two differentials are coupled via coupling pinions 41 and 43 mounted on the annulus 32 of the first differential, pinions 41 and 43 being in constant meshing engagement with a transmission gear 46 rotatably mounted on shaft 42, the outer teeth of this gear 46 meshing on the other hand with the sun wheel 35 of the second differential. The complete mechanism is enclosed in a protection case 45.

The operation of this torque converter is similar to that of the above described mechanisms.

According to this invention, a plurality of torque converters mounted in series may be used for increasing the range of speed variation while preserving a ratio N of relatively moderate value.

Figure 4:
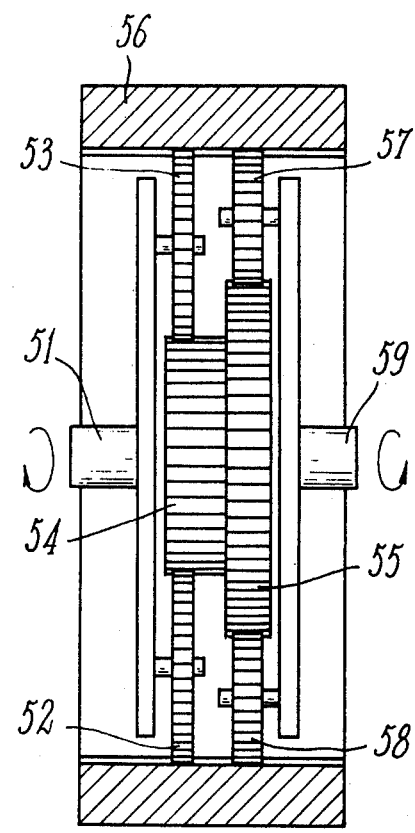
FIG. 4 is a section of a typical exemplary embodiment wherein epicyclic gear trains are used as the two differentials.

In actual practice, the two differentials may consist of a pair of epicyclic gear trains associated with each other as illustrated diagrammatically in FIG. 4.

The driving torque is imparted to a planet carrier 51 having substantially the same function as the differential cage described above. The planet gears 52 and 53 are in meshing engagement with a sun wheel 54 (rigid with the gear 55 of the output epicyclic train) and also with an internally toothed annulus 56. In this mechanism the annulus 56 and sun wheel 54 act as a planetary gear. Gears 57 and 58 are the satellites of the output train. They are in meshing engagement with the annulus 56 on the one hand and with sun wheel 55 on the other hand. The drive is shared among the set of gears 55 and 54, and the annulus 56, whereby the planet carrier 59 is driven in the same direction as the input planet carrier 51 at a velocity depending on the torque demand resulting from the resistance of the output shaft to rotation.

The operation is governed by the same laws as in the preceding differentials, but the ratio M/N is derived from the ratio of the number of teeth of sun wheels 54 and 55 to that of the teeth of annulus 56.

Among the possible and advantageous applications of the torque converter of this invention, the following may be cited by way of example:

transmission of motion in machine tools;

transmission of torque in motor vehicles, bicycles, railroad vehicles, etc. In this last instance, a coupler may be provided on the means drivingly coupling the planet wheels;

winches, hoisting and material-handling apparatus;

public works machinery and vehicles;

drilling apparatus;

the construction of servo-mechanisms;

the construction of micro-mechanisms for clockworks and the like.

Of course, this invention should not be construed as being strictly limited by the specific embodiments illustrated and described herein, since many modifications and variations may be made thereto without departing from the basic principles of the invention as disclosed in the appended claims.

What I claim is:

1. A mechanical torque converter operating by differential retroaction, said torque converter comprising:

a power input shaft;

a power receiving output shaft;

first and second differentials, the cage of the first differential being coupled to and receiving the power from said power input shaft, and the cage of the second differential being coupled to and driving said power receiving output shaft; and said first and second differentials each having planet wheels coupled by pairs such that a first group forms a gear train providing a gear ratio M and a second group forms a gear train providing a gear ratio N, wherein the ratio M/N is other than unity.

2. A mechanical torque converter according to claim 1, wherein said differentials are mounted in parallel.

3. A mechanical torque converter according to claim 1, wherein said differentials are mounted in series.

4. A mechanical torque converter according to claim 1, wherein said differentials are incorporated in each other.

5. A mechanical torque converter according to claim 4, wherein said first differential comprises a pair of satellite gears having said cage thereof rigid with said input power shaft, a sun wheel rigid with a central shaft and an annulus carrying a pair of coupling gears, said second differential comprises a pair of satellite gears the said cage of which carries said output shaft driving a torque receiving member, a first sun wheel revolving about said power shaft, and a second sun wheel rigid with said central shaft, the two differentials being operatively interconnected by said pair of coupling gears meshing with a transmission gear also in meshing engagement with one of said sun wheels of the second differential.

6. A mechanical torque converter according to claim 5, wherein said first and second differentials comprise a pair of epicyclic gear systems associated with each other, and further comprising a pair of satellite gears in meshing engagement with a sun wheel which is rigid with the gear of the output epicyclic gear system, and also with an internally toothed annulus, said annulus and sun wheel constituting the planet gears, and other gears meshing with said annulus and said epicyclic system gear, constituting the output train satellite gears, the ratio M/N being equal to the ratio of the number of teeth of said sun wheel and said output train epicyclic gears to the number of teeth of said annulus.

* * * * *